G. BLOUEN.
COUPLING.
APPLICATION FILED OCT. 28, 1919.
1,362,523.
Patented Dec. 14, 1920.
2 SHEETS—SHEET 1.
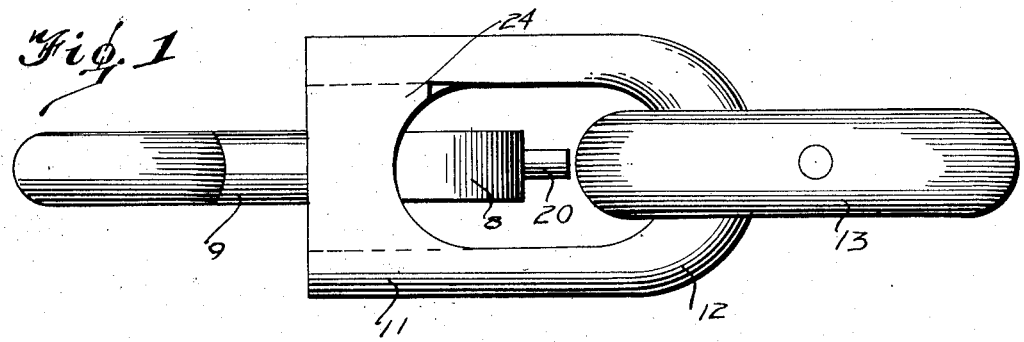
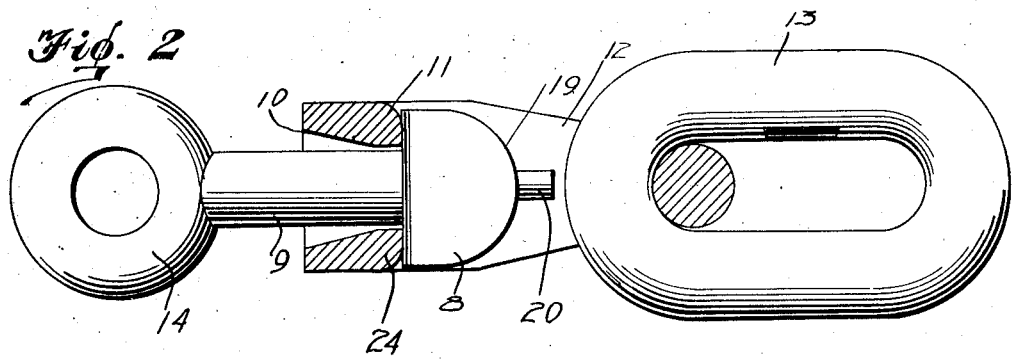
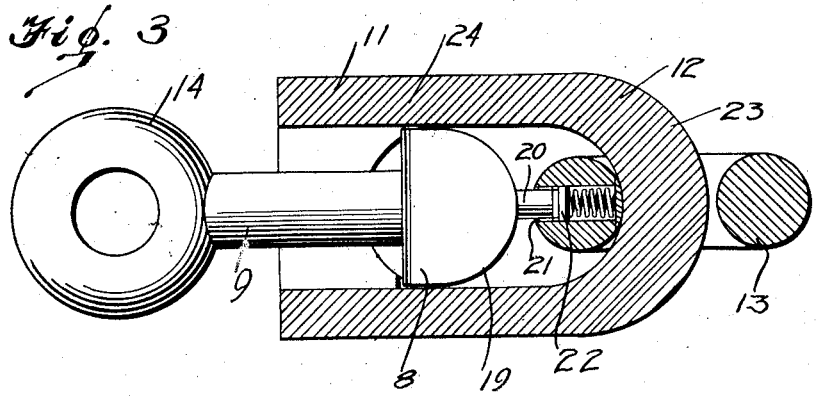
Inventor
George Blouen
By Victor J. Evans
Attorney G. BLOUEN.
COUPLING.
APPLICATION FILED OCT. 28, 1919.
1,362,523.
Patented Dec. 14, 1920.
2 SHEETS—SHEET 2.
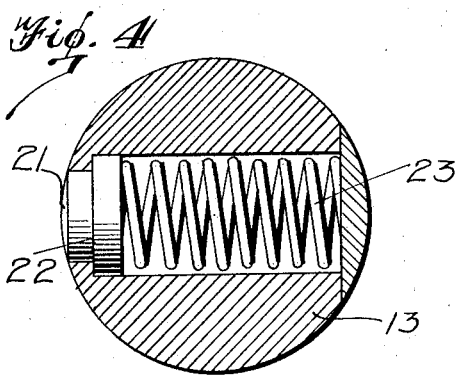
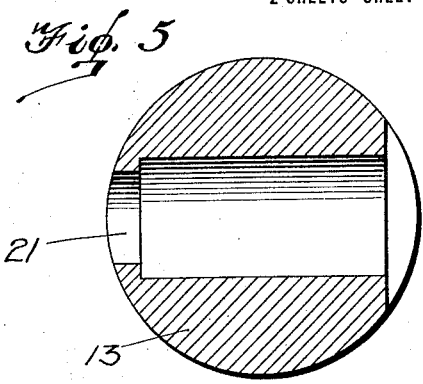
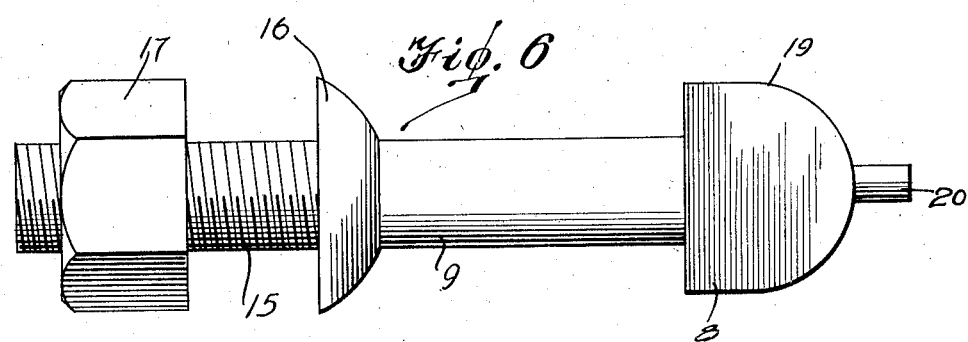
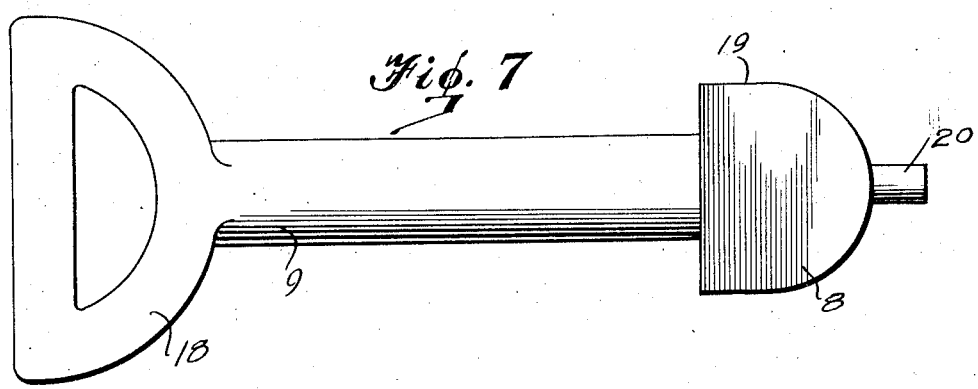
Inventor
George Blouen
By Victor J. Evans
Attorney

UNITED STATES PATENT OFFICE.

GEORGE BLOUEN, OF ANCHORAGE, TERRITORY OF ALASKA.

COUPLING.

1,362,523.  Specification of Letters Patent.  Patented Dec. 14, 1920.

Application filed October 23, 1919. Serial No. 334,024.

*To all whom it may concern:*

Be it known that I, GEORGE BLOUEN, a citizen of the United States, residing at Anchorage, in the Territory of Alaska, have invented new and useful Improvements in Couplings, of which the following is a specification.

The present invention has reference to an improvement in couplings.

The primary object of the invention is to produce a coupling for chains or the like wherein the elements constituting the same may be readily separated.

A further object of the invention is to produce a coupling comprising a head member, a socket member and a link carried by the latter, means being arranged between the head member and the link whereby the head member may be turned on the socket member to permit of the said head member being withdrawn from the socket member.

Other objects and advantages will appear as the nature of the invention is better understood, reference being had to the accompanying drawings, in which:

Figure 1 is a view illustrating a coupling constructed in accordance with this invention.

Fig. 2 is a substantially central longitudinal sectional view through the same.

Fig. 3 is a view taken approximately at right angles to Fig. 2 and illustrating the manner in which the head member co-engages with the link carried by the socket member to permit of the same when given a half turn to be withdrawn from the socket member.

Fig. 4 is a greatly enlarged transverse sectional view through the portion of the link provided with the spring influenced member that normally closes the opening therein.

Fig. 5 is a substantially similar view with the spring and plug closure member omitted.

Fig. 6 is a view of the head member having a different form of shank than that previously illustrated.

Fig. 7 is a similar view showing a still further modified form of shank on the head member.

Referring now to the drawings in detail, my improved coupling includes a head member 8 having a shank 9 that extends through a substantially rectangular and preferably flared slot 10 in the widened end of the socket member 11. The socket member, from its said widened end is provided with a bail-shaped extension 12 and in this bail is received a link 13 that forms a part of this invention.

The outer end of the shank 9, in one of the forms of my invention is provided with an eye 14, while in another form the shank has its outer end threaded as at 15 and is provided with a boss or enlargement 16 at the beginning of the threads, the said threads being engaged by a nut 17. In still another form of the device the shank of the head member has its outer end formed with a yoke or saddle 18. In every instance the head of the member has its outer face rounded as at 19 and extends laterally a suitable distance beyond the sides of the shank. The center of the rounded head is provided with a cross sectionally rounded extension in the nature of a lug 20.

The link 13 has one of its sides provided with an orifice 21 which, in one of the forms of the improvement is closed by a plug 22 that is influenced by a spring 23.

The widened end of the socket is indicated by the numeral 24, and has its inner face concaved. Preferably the inner end of the head 8 is convexed to permit of the same freely riding over the concaved inner end of the end 24. To remove the head from the socket the link 13 is turned to bring the orifice 21 directly opposite the lug 20. A pressure is exerted on the outer end of the shank with the head so that the lug 20 is forced into the orifice 21. The shank is then turned to bring the head in a line with the widened portion of the slot 10 so that the head may be readily withdrawn through the said slot. The head is inserted through the slot in the same manner, but is, of course, turned in a reverse direction to permit of the shoulders of the said head resting on the wall of the socket. The lug 20 is of a length which permits of the same contacting with the link 13 when the elements constituting the coupling are assembled, so that danger of the turning of the head in the bail portion of the socket and the accidental withdrawal of the head from the socket is thus effectively overcome.

It is thought, from the foregoing description, when taken in connection with the drawings, the simplicity of the construction and the advantages thereof will be readily apparent without further detailed description.

Having thus described the invention, what is claimed as new, is:

1. A coupling for the purpose set forth including a socket member having a widened end and a slot through said widened end, a headed member provided with a shank that passes through the slot and said head being arranged transversely with respect to the widened portion of the said slot whereby to rest on the inner wall of the socket, a lug on the head, a link connected with the socket member, and said link having an orifice therein designed to be brought to aline with the lug on the head and to receive the said lug to permit of the head being turned and withdrawn through the slot in the socket member.

2. A coupling for the purpose set forth including a socket member having a widened end and a slot through said widened end, a headed member provided with a shank that passes through the slot and said head being arranged transversely with respect to the widened portion of the said slot whereby to rest on the inner wall of the socket member, a lug on the head, a link connected with the socket member, said link having an orifice, a spring pressed plug normally closing the orifice, and said link designed to be turned on the socket member to bring the orifice in a line with the lug of the head whereby, when pressure is exerted on the head the lug will contact with the plug to force the same rearwardly to permit of the said lug entering the orifice and also permitting the head being turned on the socket member to bring the same in a line with the wider passage of the slot and the withdrawal of the head from the socket member.

In testimony whereof I affix my signature.

GEORGE BLOUEN.